(12) United States Patent
Raksha et al.

(10) Patent No.: US 7,285,336 B2
(45) Date of Patent: Oct. 23, 2007

(54) ROBUST MULTILAYER MAGNETIC PIGMENTS AND FOILS

(75) Inventors: Vladimir P. Raksha, Santa Rosa, CA (US); Paul G. Coombs, Santa Rosa, CA (US); Charles T. Markantes, Santa Rosa, CA (US); Dishuan Chu, Rohnert Park, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 11/610,256

(22) Filed: Dec. 13, 2006

(65) Prior Publication Data

US 2007/0098989 A1    May 3, 2007

Related U.S. Application Data

(62) Division of application No. 10/366,638, filed on Feb. 13, 2003, now Pat. No. 7,169,472.

(51) Int. Cl.
   *B32B 5/16*    (2006.01)
(52) U.S. Cl. ............... 428/607; 428/611; 428/686; 428/403
(58) Field of Classification Search ............... 428/606, 428/607, 611, 686, 402, 403
See application file for complete search history.

(56) References Cited

U.S. PATENT DOCUMENTS

| | | | |
|---|---|---|---|
| 6,818,299 B2* | 11/2004 | Phillips et al. | 428/403 |
| 6,838,166 B2* | 1/2005 | Phillips et al. | 428/323 |
| 7,169,472 B2* | 1/2007 | Raksha et al. | 428/403 |
| 2002/0160194 A1* | 10/2002 | Phillips et al. | 428/403 |
| 2003/0143400 A1* | 7/2003 | Phillips et al. | 428/404 |

* cited by examiner

*Primary Examiner*—H. T Le
(74) *Attorney, Agent, or Firm*—Allen, Dyer, Doppelt, Milbrath & Gilchrist, P.A.

(57) ABSTRACT

Multilayered magnetic pigment flakes and foils are provided. The pigment flakes can have a stacked layer structure on opposing sides of a magnetic core, or can be formed as an encapsulant structure with encapsulating layers around the magnetic core. The magnetic core in the stacked layer structure includes a magnetic layer that is sandwiched between opposing insulator layers, which in turn are sandwiched between opposing reflector layers. Similarly, the magnetic core in the encapsulant structure includes a magnetic layer that is surrounded by an insulator layer, which in turn is surrounded by a reflector layer. The insulator layers in the pigment flakes substantially prevent corrosion of the flakes when exposed to harsh environments. Some embodiments of the pigment flakes and foils exhibit a discrete color shift at differing angles of incident light or viewing. The pigment flakes can be interspersed into liquid media such as paints or inks to produce colorant compositions for subsequent application to objects or papers. The foils can be laminated to various objects or can be formed on a carrier substrate.

5 Claims, 2 Drawing Sheets

ROBUST MULTILAYER MAGNETIC PIGMENTS AND FOILS

CROSS-REFERENCE TO RELATED APPLICATION

The present application is a divisional application of U.S. patent application Ser. No. 10/366,638, filed on Feb. 13, 2003, now U.S. Pat. No. 7,169,472, entitled "Robust Multilayer Magnetic Pigments And Foils", assigned to the assignee of the present application, and the disclosure of which is incorporated herein.

BACKGROUND OF THE INVENTION

1. Field of the Invention

The present invention relates generally to pigments and foils. In particular, the present invention relates to robust multilayered pigment flakes and foils that have magnetic layers and which can also have optically variable characteristics, as well as pigment compositions that incorporate the multilayer magnetic pigment flakes.

2. Background Technology

Various pigments, colorants, and foils have been developed for a wide variety of applications. For example, magnetic pigments have been developed for use in applications such as decorative cookware, creating patterned surfaces, and security devices. Similarly, color shifting pigments have been developed for such uses as cosmetics, inks, coating materials, ornaments, ceramics, automobile paints, anti-counterfeiting hot stamps, and anti-counterfeiting inks for security documents and currency.

Color shifting pigments, colorants, and foils exhibit the property of changing color upon variation of the angle of incident light, or as the viewing angle of the observer is changed. The color-shifting properties of pigments and foils can be controlled through proper design of optical thin films or orientation of the molecular species used to form the flake or foil coating structure. Desired effects can be achieved through the variation of parameters such as thickness of the layers forming the flakes and foils and the index of refraction of each layer. The changes in perceived color that occur for different viewing angles or angles of incident light are a result of a combination of selective absorption of the materials comprising the layers and wavelength dependent interference effects. The interference effects, which arise from the superposition of light waves that have undergone multiple reflections, are responsible for the shifts in color perceived with different angles. The reflection maxima changes in position and intensity, as the viewing angle changes, due to changing interference effects arising from light path length differences in the various layers of a material that are selectively enhanced at particular wavelengths.

Various approaches have been used to achieve such color shifting effects. For example, small multilayer flakes, typically composed of multiple layers of thin films, are dispersed throughout a medium such as paint or ink that may then be subsequently applied to the surface of an object. Such flakes may optionally be overcoated to achieve desired colors and optical effects. Another approach is to encapsulate small metallic or silicatic substrates with varying layers and then disperse the encapsulated substrates throughout a medium such as paint or ink. Additionally, foils composed of multiple layers of thin films on a substrate material have been made.

One manner of producing a multilayer thin film structure is by formation on a flexible web material with a release layer thereon. The various layers are deposited on the web by methods well known in the art of forming thin coating structures, such as PVD, sputtering, or the like. The multilayer thin film structure is then removed from the web material as thin film color shifting flakes, which can be added to a polymeric medium such as various pigment vehicles for use as an ink or paint. In addition to the color shifting flakes, additives can be added to the inks or paints to obtain desired color shifting results.

Color shifting pigments or foils have been formed from a multilayer thin film structure that includes the same basic layers. These include an absorber layer(s), a dielectric layer(s), and optionally a reflector layer, in varying layer orders. The coatings have been formed to have a symmetrical multilayer thin film structure, such as:

absorber/dielectric/reflector/dielectric/absorber; or
absorber/dielectric/absorber.

Coatings have also been formed to have an asymmetrical multilayer thin film structure, such as: absorber/dielectric/reflector.

With regard to magnetic pigments, U.S. Pat. No. 4,838,648 to Phillips et al. (hereafter "Phillips '648") discloses a thin film magnetic color shifting structure wherein the magnetic material can be used as a reflector or absorber layer. One disclosed magnetic material is a cobalt nickel alloy. Phillips '648 discloses flakes and foils with the following structures:

dyed superstrate/absorber/dielectric/magnetic layer/substrate;
dyed superstrate/absorber/dielectric/magnetic layer/dielectric/absorber/dyed superstrate; and
adhesive/magnetic layer/dielectric/absorber/releasable hardcoat/substrate.

One attempt at incorporating a magnetic layer into a multilayer flake is disclosed in European Patent Publication EP 686675B1 to Schmid et al. (hereinafter "Schmid"), which describes laminar color shifting structures which include a magnetic layer between the dielectric layer and a central aluminum layer as follows:

oxide/absorber/dielectric/magnet/Al/magnet/dielectric/absorber/oxide

Thus, Schmid uses aluminum platelets and then coats these platelets with magnetic materials. However, the overlying magnetic material downgrades the reflective properties of the pigment because aluminum is the second brightest metal (after silver), and thus any magnetic material is less reflective. Further, Schmid starts with aluminum platelets generated from ballmilling, a method which is limited in terms of the layer smoothness that can be achieved.

Accordingly, there is a need for improved magnetic pigment flakes and foils that overcome or avoid the deficiencies of prior flakes and foils.

SUMMARY OF THE INVENTION

The present invention relates to multilayered pigment flakes and foils that have magnetic properties. The pigment flakes can have a stacked layer structure on opposing sides of a magnetic core, or can be formed as an encapsulant structure with encapsulating layers around the magnetic core. The magnetic core in the stacked layer structure includes a magnetic layer that is sandwiched between opposing insulator layers, which in turn are sandwiched between opposing reflector layers. Similarly, the magnetic core in the encapsulant structure includes a magnetic layer that is surrounded by an insulator layer, which in turn is surrounded by a reflector layer. The insulator layers in the pigment flakes substantially prevent corrosion of the flakes when exposed to harsh environments.

Some embodiments of the magnetic pigment flakes and foils exhibit a color shift at differing angles of incident light or viewing. The color shifting embodiments exhibit a discrete color shift so as to have a first color at a first angle of incident light or viewing and a second color different from the first color at a second angle of incident light or viewing.

The pigment flakes can be interspersed into liquid media such as paints or inks to produce colorant compositions for subsequent application to objects or papers. The foils can be laminated to various objects or can be formed on a carrier substrate.

These and other features of the present invention will become more fully apparent from the following description and appended claims, or may be learned by the practice of the invention as set forth hereafter.

BRIEF DESCRIPTION OF THE DRAWINGS

In order to illustrate the above and other features of the present invention, a more particular description of the invention will be rendered by reference to specific embodiments thereof that are illustrated in the appended drawings. It will be appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE INVENTION

Figure 1:
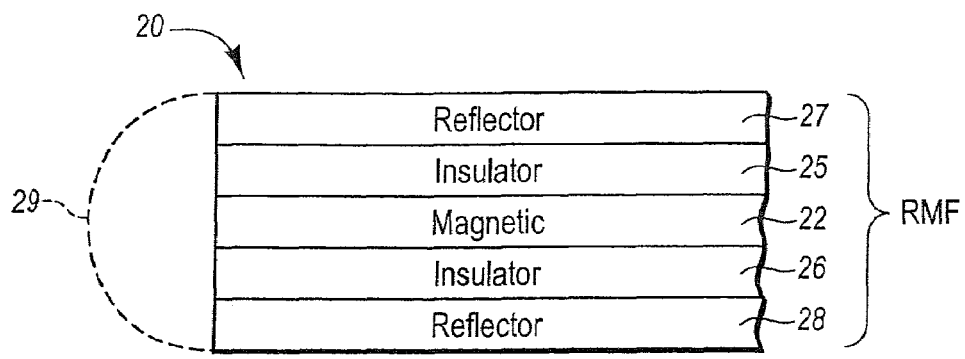
FIG. 1 is a schematic representation of the coating structure of a magnetic pigment flake according to one embodiment of the invention.

The present invention relates to multilayer pigment flakes and foils having magnetic layers, and pigment compositions that incorporate the magnetic flakes. The flakes and foils can be used to create security features that are not visually perceptible, to create illusionary or three dimensional-like images for security devices, or to add decorative features to a product. Unlike many conventional magnetic flakes, the flakes of the invention are not only composed of magnetizable materials, but include both magnetizable and non-magnetizable materials. For example, the invention encompasses pigment flakes and foils wherein an insulator layer is disposed between a magnetic layer and a reflector layer. The insulator layer in the pigment flakes and foils substantially prevents corrosion of the flakes and foils when exposed to harsh environments.

It has been found that a magnetic pigment having a magnetic layer contiguous with a metal reflector layer such as aluminum is best suited for temperature and humidity controlled environments. In harsh environments such as outdoors, high humidity, and salt mist or solution, such a magnetic pigment degrades because of galvanic corrosion of the more electronegative metal, such as aluminum.

Galvanic corrosion (also called corrosion of dissimilar metals) is the process by which a material oxidizes or corrodes when placed in contact with another material under certain conditions. There are three particular conditions that must exist for galvanic corrosion to occur. First, there must be two electrochemically dissimilar metals present. Second, the two metals must be in contact so as to provide an electrically conductive path between the two metals. Third, there must also be a conductive path present that allows the metal ions to move from the more electronegative metal (anode) to the more electropositive metal (cathode). If any one of these three conditions does not exist, galvanic corrosion will not occur.

To reduce corrosion in magnetic pigments having contiguous dissimilar metals, it is enough to eliminate one of the three above described conditions for galvanic corrosion. The easiest condition to eliminate is the electrical contact between dissimilar metals by placing very thin insulating layers between the dissimilar metals. Various pigment and foil embodiments with such insulating layers are described in further detail below.

In various embodiments of the present invention, the pigment flakes and foils have substantial shifts in chroma and hue with changes in angle of incident light or viewing angle of an observer. Such an optical effect, known as goniochromaticity or "color shift," allows a perceived color to vary with the angle of illumination or observation. Accordingly, such pigment flakes and foils exhibit a first color at a first angle of incident light or viewing and a second color different from the first color at a second angle of incident light or viewing. The pigment flakes can be interspersed into liquid media such as paints or inks to produce various color shifting colorant compositions for subsequent application to objects or papers. The foils can be laminated to various objects or can be formed on a carrier substrate.

Generally, the color shifting pigment flakes of the invention can have a symmetrical stacked coating structure on opposing sides of a magnetic core layer, can have an asymmetrical coating structure with a majority of the layers on one side of the magnetic layer, or can be formed with one or more encapsulating coatings which surround a magnetic core. The coating structure of the color shifting flakes and foils generally includes a magnetic core, which includes a magnetic or magnetizable layer and other optional layers, an insulating layer over the magnetic core, a reflector layer over the insulating layer, a dielectric layer over the reflector layer, and an absorber layer over the dielectric layer. The term "over" used herein with respect to the relationship between layers is intended to include layers that are contiguous with each other as well as layers that are noncontiguous.

The present invention presents a significant improvement over conventional magnetic pigments by substantially achieving higher chroma and brightness. By putting the duller magnetic material inside of the reflector, the present invention accomplishes two objectives: 1) the reflectivity of the reflector layer is maintained; and 2) color shifting pigments without the inner core of magnetic material cannot be distinguished by an observer from such pigment with the core of magnetic material. For example, two coated objects viewed side by side, one with and one without the magnetic material in the coating, would look the same to the observer. However, the magnetic color shifting pigment provides a covert security feature in addition to the color shifting effect. Thus, with a magnetic detection system, a magnetic covert signature in the pigment could be read by a Faraday rotator detector, for example.

Illusionary or three dimensional-like image effects can be created by exposing the pigment flakes of the invention to an external magnetic force, thereby orienting the plane of some of the flakes normal to the surface of a coating containing the flakes. The pigment flakes not oriented by the magnetic field lie with their planar surface generally parallel to the surface of the coating. The three dimensional-like image effect is due to the alignment of the particles such that the aspect ratio is oriented with the magnetic field, i.e., the longest part of the pigment flake aligns itself along the magnetic field lines. Methods of creating illusionary and three dimensional-like images that can employ the magnetic pigments disclosed herein are described in further detail in a copending U.S. patent application Ser. No. 09/850,421, filed on May 7, 2001, and entitled "Methods For Producing Imaged Coated Articles By Using Magnetic Pigments", the disclosure of which is incorporated herein by reference.

The color shifting flakes and foils of the invention can be formed using conventional thin film deposition techniques, which are well known in the art of forming thin coating structures. Nonlimiting examples of such thin film deposition techniques include physical vapor deposition (PVD), chemical vapor deposition (CVD), plasma enhanced (PE) variations thereof such as PECVD or downstream PECVD, sputtering, electrolysis deposition, and other like deposition methods that lead to the formation of discrete and uniform thin film layers.

The color shifting pigment flakes of the invention can be formed by various fabrication methods. For example, the pigment flakes can be formed by a web coating process in which various layers are sequentially deposited on a web material by conventional deposition techniques to form a thin film structure, which is subsequently fractured and removed from the web, such as by use of a solvent, to form a plurality of thin film flakes.

In another fabrication method, one or more thin film layers including at least the magnetic layer is deposited on a web to form a film, which is subsequently fractured and removed from the web to form a plurality of pigment preflakes. The preflakes can be fragmented further by grinding if desired. The preflakes are then coated with the remaining layer or layers in a sequential encapsulation process to form a plurality of pigment flakes.

In another fabrication method, magnetic particles can be coated in a sequential encapsulation process to form a plurality of pigment flakes. When an encapsulation process is used for forming the outer layers of the flakes, it will be appreciated that each respective encapsulating layer is a continuous layer composed of one material surrounding the flake structure.

Referring now to the drawings, wherein like structures are provided with like reference designations, FIG. 1 depicts a reflective magnetic flake (RMF) 20 according to one embodiment of the invention. The RMF 20 can be a generally symmetrical thin film structure comprising a magnetic layer 22, a first insulator layer 25 over one major surface of magnetic layer 22, and a second insulator layer 26 over an opposing second major surface of magnetic layer 22. A first reflector layer 27 is over first insulator layer 25, and a second reflector layer 28 is over second insulator layer 26.

By inserting the insulator layer between the reflector layer and the magnetic layer galvanic corrosion of the flake is prevented. In addition, with the magnetic layer located between the outer reflector layers such as shown in FIG. 1, the optical properties of the reflector layers are not degraded and the flake remains highly reflective.

Flakes corresponding to RMF 20 can be formed by a web coating process such as described previously, in which the various layers are sequentially deposited on a web material to form a thin film structure, which is subsequently fractured and removed from the web to form a plurality of flakes. Alternatively, the first and second reflector layers 27 and 28 can be formed as part of a contiguous reflecting layer 29 (shown in phantom) substantially surrounding magnetic layer 22 and insulator layers 25 and 26, which have been previously formed by a web coating process.

The RMF 20 can be used as a pigment flake or can be used as a core section with additional layers applied thereover such as in a color shifting pigment. In the case of a color shifting pigment, maintaining the high reflectivity of the reflector layer is important to preserve high brightness and chroma of the pigment. Each of the layers in the coating structure of RMF 20 is discussed hereafter in greater detail.

The magnetic layer 22 can be composed of any magnetic or magnetizable material, such as nickel, cobalt, iron, gadolinium, terbium, dysprosium, erbium, and alloys or oxides thereof. For example, a cobalt nickel alloy can be employed, with the cobalt and nickel having a ratio by weight of about 80% and about 20%, respectively. This ratio for each of these metals in the cobalt nickel alloy can be varied by plus or minus about 10% and still achieve the desired results. Thus, cobalt can be present in the alloy in an amount from about 70% to about 90% by weight, and nickel can be present in the alloy in an amount from about 10% to about 30% by weight. Other examples of alloys include Fe/Si, Ni/Fe (e.g., permalloy), Fe/Ni, Fe/Co, Fe/Ni/Mo, and combinations thereof. Hard magnetics of the type $SmCO_5$, $NdCO_5$, $Sm_2CO_{17}$, $Nd_2Fe_{14}B$, $Sr_6Fe_2O_3$, $TbFe_2$, Al—Ni—Co, and combinations thereof, can also be used as well as spinel ferrites of the type $Fe_3O_4$, $NiFe_2O_4$, $MnFe_2O_4$, $CoFe_2O_4$, or garnets of the type YIG (yttrium iron garnet) or GdIG (gadolinium iron garnet), and combinations thereof.

Although this broad range of magnetic materials can be used, the soft magnets are preferred in some embodiments of the invention. As used herein, the terminology "soft magnets" refers to any material exhibiting ferromagnetic properties but having a remanence that is substantially zero after exposure to a magnetic force. Soft magnets show a quick response to an applied magnetic field, but have very low (coercive fields (Hc)=0.05-300 Oersteds (Oe)) or zero magnetic signatures, or retain very low magnetic lines of force after the magnetic field is removed. In addition, as used herein, the terminology "hard magnets" (also called permanent magnets) refers to any material that exhibits ferromagnetic properties and has a long lasting remanence after exposure to a magnetizing force. A ferromagnetic material is any material that has a permeability substantially greater than 1 and that exhibits magnetic hysteresis properties.

The magnetic materials used to form magnetic layers in the flakes and foils of the invention preferably have a coercivity of less than about 2000 Oe, and more preferably less than about 300 Oe. Coercivity refers to the ability of a material to be demagnetized by an external magnetic field. The higher the value of coercivity, the higher the magnetic field required to demagnetize the material after the field is removed. In some embodiments of the invention, the magnetic layers used are preferably "soft" magnetic materials (easily demagnetized), as opposed to "hard" magnetic materials (difficult to demagnetize) which have higher coercivities. The coercivities of the foils, pigments or colorants of the magnetic color shifting designs according to the invention are preferably in a range of about 50 Oe to about 300 Oe. These coercivities are lower than in standard recording materials. Thus, embodiments of the invention that use soft magnets in magnetic color shifting pigments and magnetic non color shifting pigments are an improvement over conventional technologies. The use of soft magnetic materials in pigment flakes allows for easier dispersion of the flakes without clumping.

The magnetic layer 22 can be formed to have a suitable physical thickness from about 20 nm to about 3000 nm, and preferably from about 50 nm to about 150 nm.

The insulator layers 25 and 26 can be composed of any suitable electrical insulating material such as a dielectric material or some semiconductor materials. For example, the insulator layers can be composed of magnesium fluoride, aluminum oxide, nickel oxide, or combinations thereof, as well as any other insulating material that is suitable for use in thin film manufacturing processes and has the appropriate electrical insulating properties The insulator layers have an effective thickness for substantially preventing corrosion of the pigment flake by breaking an electrical path between the metal reflector layer (discussed hereafter) and the magnetic layer of the pigment flake. For example, the insulator layers can each have a physical thickness of at least about 10 nm, and preferably about 20 nm to about 40 nm.

The reflector layers 27 and 28 can be composed of various reflective materials. Presently preferred materials are one or more metals, one or more metal alloys, or combinations thereof, because of their high reflectivity and ease of use, although non-metallic reflective materials can also be used. Nonlimiting examples of suitable metallic materials for the reflector layers include aluminum, silver, copper, gold, platinum, tin, titanium, palladium, nickel, cobalt, rhodium, niobium, chromium, iridium, and combinations or alloys thereof. The reflector layers 24, 26 can be formed to have a suitable physical thickness from about 20 nm to about 1000 nm, and preferably from about 50 nm to about 100 nm.

In an alternative embodiment of flake 20, an asymmetrical thin film flake can be provided that includes a thin film stack structure with the same layers as on one side of magnetic layer 22 as shown in FIG. 1. In such an embodiment, the asymmetrical flake includes magnetic layer 22, insulator layer 25 overlying magnetic layer 22, and reflector layer 27 overlying insulator layer 25. Each of these layers can be composed of the same materials and have the same thicknesses as described above for the corresponding layers of flake 20.

In a further alternative embodiment, opposing dielectric layers may optionally be added to overlie reflector layers 27 and 28 of flake 20. These opposing dielectric layers add durability, rigidity, and corrosion resistance to flake 20. Alternatively, an encapsulating dielectric layer may be formed to substantially surround reflector layers 27, 28 and magnetic layer 22. The dielectric layer(s) may be optionally clear, or may be selectively absorbing so as to contribute to the color effect of the pigment flake. Examples of suitable dielectric materials for such dielectric layers are described hereafter with respect to the embodiment of FIG. 2.

Figure 2:
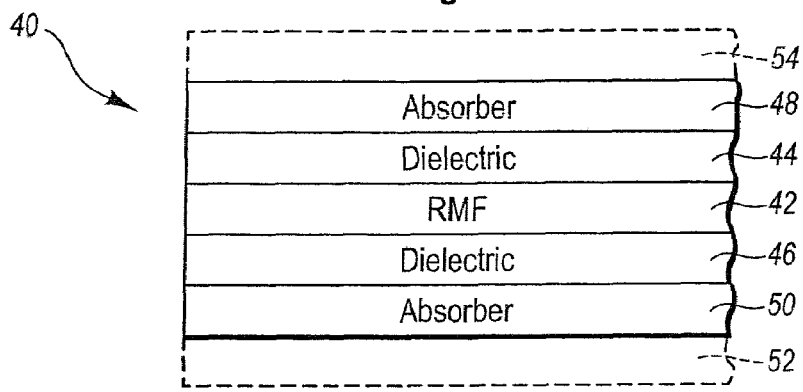
FIG. 2 is a schematic representation of the coating structure of a magnetic pigment flake according to another embodiment of the invention.

FIG. 2 depicts a magnetic color shifting pigment flake 40 based upon a RMF according to another embodiment of the invention. The flake 40 is a generally symmetrical multilayer thin film structure having coating layers over opposing sides of a RMF 42, which has a five-layer structure such as shown for the RMF in FIG. 1. As shown in FIG. 2, a first dielectric layer 44 and a second dielectric layer 46 are respectively over opposing sides of RMF 42. A first absorber layer 48 and a second absorber layer 50 are respectively over each of dielectric layers 44 and 46. The RMF 42 can be formed from the same materials as discussed hereinabove for the RMF of FIG. 1, while the dielectric and absorber layers of flake 40 are discussed hereafter in greater detail.

Flakes corresponding to flake 40 can be formed by a web coating process such as described previously, in which the various layers of flake 40 are sequentially deposited on a web material to form a thin film structure, which is subsequently fractured and removed from the web to form a plurality of flakes.

The dielectric layers 44 and 46 act as spacers in the thin film stack structure of flake 40. The dielectric layers are formed to have an effective optical thickness for imparting interference color and desired color shifting properties. The dielectric layers may be optionally clear, or may be selectively absorbing so as to contribute to the color effect of a pigment. The optical thickness is a well known optical parameter defined as the product $\eta d$, where $\eta$ is the refractive index of the layer and d is the physical thickness of the layer. Typically, the optical thickness of a layer is expressed in terms of a quarter wave optical thickness (QWOT) that is equal to $4\eta d/\lambda$, where $\lambda$ is the wavelength at which a QWOT condition occurs. The optical thickness of the dielectric layers can range from about 2 QWOT at a design wavelength of about 400 nm to about 9 QWOT at a design wavelength of about 700 nm, and preferably about 2-6 QWOT at 400-700 nm, depending upon the color shift desired. The dielectric layers can have a physical thickness of about 100 nm to about 800 nm, and preferably about 140 nm to about 650 nm, depending on the color characteristics desired.

Suitable materials for dielectric layers 44 and 46 include those having a "high" index of refraction, defined herein as greater than about 1.65, as well as those have a "low" index of refraction, which is defined herein as about 1.65 or less. Each of the dielectric layers can be formed of a single material or with a variety of material combinations and configurations. For example, the dielectric layers can be formed of only a low index material or only a high index material, a mixture or multiple sublayers of two or more low index materials, a mixture or multiple sublayers of two or more high index materials, or a mixture or multiple sublayers of low index and high index materials. In addition, the dielectric layers can be formed partially or entirely of high/low dielectric optical stacks, which are discussed in further detail below. When a dielectric layer is formed partially with a dielectric optical stack, the remaining portion of the dielectric layer can be formed with a single material or various material combinations and configurations as described above.

Examples of suitable high refractive index materials for dielectric layers 44 and 46 include zinc sulfide (ZnS), zinc oxide (ZnO), zirconium oxide ($ZrO_2$), titanium dioxide ($TiO_2$), diamond-like carbon, indium oxide ($In_2O_3$), indium-tin-oxide (ITO), tantalum pentoxide (Ta2O5), ceric oxide ($CeO_2$), yttrium oxide ($Y_2O_3$), europium oxide ($Eu_2O_3$), iron oxides such as (II)diiron(III) oxide ($Fe_3O_4$) and ferric oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon monoxide (SiO), selenium trioxide ($Se_2O_3$), tin oxide ($SnO_2$), tungsten trioxide ($WO_3$), combinations thereof, and the like.

Examples of suitable low refractive index materials for dielectric layers 44 and 46 include silicon dioxide ($SiO_2$), aluminum oxide ($Al_2O_3$), metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$, $Na_5Al_3F_{14}$), neodymium fluoride ($NdF_3$), samarium fluoride ($SmF_3$), barium fluoride ($BaF_2$), calcium fluoride ($CaF_2$), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), perfluoroalkenes, polytetrafluoroethylene (Teflon), fluorinated ethylene propylene (FEP), combinations thereof, and the like.

It should be appreciated that several of the above-listed dielectric materials are typically present in non-stoichiometric forms, often depending upon the specific method used to deposit the dielectric material as a coating layer, and that the above-listed compound names indicate the approximate stoichiometry. For example, silicon monoxide and silicon dioxide have nominal 1:1 and 1:2 silicon:oxygen ratios, respectively, but the actual silicon:oxygen ratio of a particular dielectric coating layer varies somewhat from these nominal values. Such non-stoichiometric dielectric materials are also within the scope of the present invention.

As mentioned above, the dielectric layers can be formed of high/low dielectric optical stacks, which have alternating layers of low index (L) and high index (H) materials. When a dielectric layer is formed of a high/low dielectric stack, the color shift at angle will depend on the combined refractive index of the layers in the stack. Examples of suitable stack configurations for the dielectric layers include LH, HL, LHL, HLH, HLHL, LHLH, or in general $(LHL)^n$ or $(HLH)^n$, where n=1-100, as well as various multiples and combinations thereof. In these stacks, LH, for example, indicates discrete layers of a low index material and a high index material.

In an alternative embodiment, the high/low dielectric stacks are formed with a gradient index of refraction. For example, the stack can be formed with layers having a graded index low-to-high, a graded index high-to-low, a graded index [low-to-high-to-low]$^n$, a graded index [high-to-low-to-high]$^n$, where n=1-100, as well as combinations and multiples thereof. The graded index is produced by a gradual variance in the refractive index, such as low-to-high index or high-to-low index, of adjacent layers. The graded index of the layers can be produced by changing gases during deposition or co-depositing two materials (e.g., L and H) in differing proportions. Various high/low optical stacks can be used to enhance color shifting performance, provide antireflective properties to the dielectric layer, and change the possible color space of the pigments of the invention.

The dielectric layers 44 and 46 can each be composed of the same material or a different material, and can have the same or different optical or physical thickness for each layer. It will be appreciated that when the dielectric layers are composed of different materials or have different thicknesses, the flakes exhibit different colors on each side thereof and the resulting mix of flakes in a pigment or paint mixture would show a new color which is the combination of the two colors. The resulting color would be based on additive color theory of the two colors coming from the two sides of the flakes. In a multiplicity of flakes, the resulting color would be the additive sum of the two colors resulting from the random distribution of flakes having different sides oriented toward the observer.

The absorber layers 48 and 50 of flake 40 can be composed of any absorber material having the desired absorption properties, including materials that are uniformly absorbing or non-uniformly absorbing in the visible part of the electromagnetic spectrum. Thus, selective absorbing (non-uniformly absorbing) materials or nonselective absorbing (uniformly absorbing) materials can be used, depending on the color characteristics desired. For example, the absorber layers can be formed of nonselective absorbing metallic materials deposited to a thickness at which the absorber layer is at least partially absorbing, or semi-opaque.

Nonlimiting examples of suitable absorber materials include metallic absorbers such as chromium, aluminum, nickel, silver, copper, palladium, platinum, titanium, vanadium, cobalt, iron, tin, tungsten, molybdenum, rhodium, and niobium, as well as their corresponding oxides, sulfides, and carbides. Other suitable absorber materials include carbon, graphite, silicon, germanium, cermet, ferric oxide or other metal oxides, metals mixed in a dielectric matrix, and other substances that are capable of acting as a nonselective or selective absorber in the visible spectrum. Various combinations, mixtures, compounds, or alloys of the above absorber materials may be used to form the absorber layers of flake 40.

Examples of suitable alloys of the above absorber materials include Inconel (Ni—Cr—Fe), stainless steels, Hastalloys (e.g., Ni—Mo—Fe; Ni—Mo—Fe—Cr; Ni—Si—Cu) and titanium-based alloys, such as titanium mixed with carbon (Ti/C), titanium mixed with tungsten (Ti/W), titanium mixed with niobium (Ti/Nb), titanium mixed with silicon (Ti/Si), and combinations thereof.

As mentioned above, the absorber layers can also be composed of an absorbing metal oxide, metal sulfide, metal carbide, or combinations thereof. For example, one preferred absorbing sulfide material is silver sulfide. Other examples of suitable compounds for the absorber layers include titanium-based compounds such as titanium nitride (TiN), titanium oxynitride ($TiN_xO_y$), titanium carbide (TiC), titanium nitride carbide ($TiN_xC_z$), titanium oxynitride carbide ($TiN_xO_yC_z$), titanium silicide ($TiSi_2$), titanium boride ($TiB_2$), and combinations thereof. In the case of $TiN_xO_y$ and $TiN_xO_yC_z$, preferably x=0 to 1, y=0 to 1, and z=0 to 1, where x+y=1 in $TiN_xO_y$ and x+y+z=1 in $TiN_xO_yC_z$. For $TiN_xC_z$, preferably x=0 to 1 and z=0 to 1, where x+z=1 Alternatively, the absorber layers can be composed of a titanium-based alloy disposed in a matrix of Ti, or can be composed of Ti disposed in a matrix of a titanium-based alloy.

It will be appreciated by one skilled in the art that the absorber layers also can also be formed from a magnetic material, such as a cobalt nickel alloy or other magnetic materials described previously. This simplifies the manufacture of the magnetic color shifting pigments by reducing the number of materials required.

The absorber layers are formed to have a physical thickness in the range from about 3 nm to about 50 nm, and preferably from about 5 nm to about 15 nm, depending upon the optical constants of the absorber layer material and the desired peak shift. The absorber layers can each be composed of the same material or a different material, and can have the same or different physical thickness for each layer.

In an alternative embodiment of flake 40, an asymmetrical color shifting flake can be provided that includes a thin film stack structure with the same layers as on one side of RMF 42 as shown in FIG. 2. Accordingly, the asymmetrical color shifting flake includes RMF 42, dielectric layer 44 overlying RMF 42, and absorber layer 48 overlying dielectric layer 44. Each of these layers can be composed of the same materials and have the same thicknesses as described above for the corresponding layers of flake 40. In addition, asymmetrical color shifting flakes can be formed by a web coating process such as described above in which the various layers are sequentially deposited on a web material to form a thin film structure, which is subsequently fractured and removed from the web to form a plurality of flakes.

In a further alternative embodiment, flake 40 can be formed without the absorber layers. In this embodiment, opposing dielectric layers 44 and 46 are formed of high/low (H/L) dielectric optical stacks such as described previously. Thus, dielectric layers 44 and 46 can be configured such that flake 40 has the coating structures: (HL)$^n$/RMF/(LH)$^n$, (LH)$^n$/RMF/(HL)$^n$, (LHL)$^n$/RMF/(LHL)$^n$, (HLH)$^n$/RMF/(HLH)$^n$, or other similar configurations, where n=1-100 and the L and H layers are 1 quarterwave (QW) at a design wavelength.

As a general rule, galvanic corrosion occurs between two metals if the algebraic difference of their atomic potentials in the Noble Metals Table is greater than +/−0.3 volts. The potential of the aluminum/nickel pair is −1.41 V, indicating there is a driving force for galvanic corrosion of aluminum in a pigment having a seven-layer design, such as Cr/MgF$_2$/Al/Ni/Al/MgF$_2$/Cr, when the pigment is either immersed in an electrolytic solution or exposed to a humid environment. This seven-layer design pigment is particularly sensitive to exposure in alkali or other basic solutions. To reduce corrosion of aluminum in such a pigment, the electrical contact between the dissimilar metals Al and Ni is eliminated by placing the insulator layers described herein between the dissimilar metals. In such a scheme, the design of the seven-layer pigment changes to a to a nine-layer pigment, such as shown in FIG. 2, wherein the two insulator layers are inserted between the aluminum layer and the magnetic layer such as shown below:

Cr/MgF$_2$/Al/MgF$_2$ 20 nm/Magnetic composite/MgF$_2$ 20 nm/Al/MgF$_2$/Cr

From a manufacturing convenience, the two insulator layers in this embodiment can be made from magnesium fluoride, which is a constituent component of the dielectric layers of the pigment. Fabrication of the pigment with insulator layers of MgF$_2$ requires two additional steps of rewinding the polyester roll (web) with a partially coated multilayered stack and deposition of the insulator layers of magnesium fluoride. In an alternative manufacturing scheme, the aluminum and magnetic layers can be separated by deposition of a 20 nm thick film of Al$_2$O$_3$ by reactive evaporation of aluminum in the presence of oxygen.

In a further alternative manufacturing scheme, the surface of the first reflector layer such as aluminum is oxidized and the surface of the magnetic layer over the oxidized reflector layer is oxidized to thereby form oxide films between the dissimilar metals. For such a process, ion guns are installed downstream a short distance after the aluminum source but upstream from the source of a magnetic material. In this way, the first aluminum layer, being deposited from an aluminum source onto a first dielectric layer which has been deposited onto a first absorber layer, goes through an oxidation zone where its surface oxidizes to form a dense insulating film of aluminum oxide. The oxygen pressure, ion gun power, and the polyester roll rewinding speed are all parameters used to control the thickness of the Al$_2$O$_3$ film. In the next step, a magnetic material (e.g., nickel) is deposited on top of the insulating Al$_2$O$_3$ film. In the oxidation zone, a dense NiO layer forms on the surface of the magnetic material, thereby insulating the magnetic layer from the subsequent second aluminum layer. The NiO layer is a p-type semiconductor that provides electrical separation of the nickel layer and the second aluminum layer. After deposition of the second aluminum layer, a second dielectric layer such as a magnesium fluoride spacer is formed, followed by a second absorber layer such as a chromium absorber to complete the optical stack that has the following design:

Substrate/Cr/MgF$_2$/Al/Al$_2$O$_3$/Ni/NiO/Al/MgF$_2$/Cr

The thickness of insulating layers in the ion gun approach can be less than about 20 nm because these layers have a higher density than films deposited by thermal or reactive evaporation. The advantage of such a process is that it is very similar to the process used in forming a seven-layer stack as far as the number of polyester roll passes through a coating machine, but the ion gun process generates a robust nine-layer design that is corrosion-resistant in humid environments and in electrolytic solutions.

Figure 3:
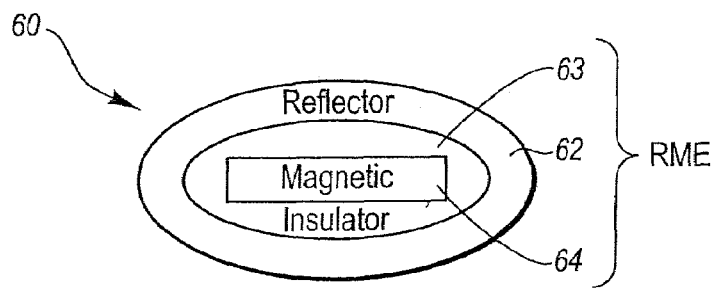
FIG. 3 is a schematic representation of the coating structure of a magnetic pigment flake according to a further embodiment of the invention.

FIG. 3 depicts a reflective magnetic encapsulated (RME) flake 60 according to another embodiment of the invention. The RME flake 60 has a three layer coating structure, with a reflector layer 62 substantially surrounding and encapsulating an insulator layer 63, which surrounds a core magnetic layer 64. The insulator layer 63 between reflector layer 62 and magnetic layer 64 prevents galvanic corrosion of flake 60. In addition, with the magnetic layer located within the outer reflector layer such as shown in FIG. 3, the optical properties of the reflector layer is not degraded and the reflector layer remains highly reflective.

The RME flake 60 can be used as a pigment particle, or can be used as a core particle with additional layers applied thereover. The reflector layer 62, insulator layer 63, and magnetic layer 64 can be composed of the same materials and can have the same thicknesses as discussed previously for the corresponding layers in flake 20.

In an alternative embodiment of flake 60, a dielectric layer may optionally be added to overlie reflector layer 62, to add durability, rigidity, and corrosion resistance to flake 60. The dielectric layer may be optionally clear, or may be selectively absorbing so as to contribute to the color effect of the flake.

Figure 4:
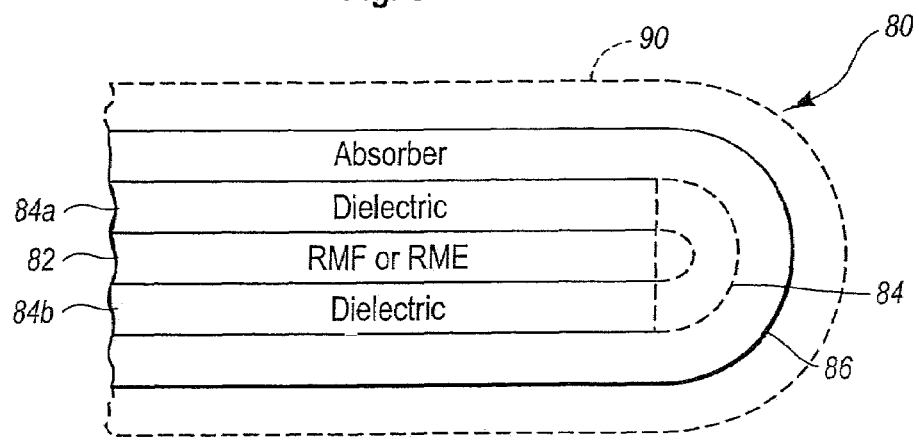
FIG. 4 is a schematic representation of the coating structure of a magnetic pigment flake according to alternative embodiments of the invention.

FIG. 4 depicts alternative coating structures (with phantom lines) for a magnetic color shifting pigment flake 80 in the form of an encapsulate based upon either the RMF or the RME flake discussed with respect to FIGS. 1 and 3. The flake 80 has a magnetic core section 82 that is either a RMF or a RME flake, which can be overcoated by an encapsulating dielectric layer 84 substantially surrounding magnetic core section 82. An absorber layer 86, which overcoats dielectric layer 84, provides an outer encapsulation for flake 80. The hemispherical dashed lines on one side of flake 80 in FIG. 4 indicate that dielectric layer 84 and absorber layer 86 can be formed as contiguous layers around magnetic core section 82.

Alternatively, the magnetic core section 82 and dielectric layer can be in the form of a thin film core flake stack, in which opposing dielectric layers 84a and 84b are preformed on the top and bottom surfaces but not on at least one side surface of magnetic core section 82 which is a RMF, with absorber layer 86 encapsulating the thin film stack. An encapsulation process can also be used to form additional layers on flake 80 such as a capping layer (not shown). The pigment flake 80 exhibits a discrete color shift such that the pigment flake has a first color at a first angle of incident light or viewing and a second color different from the first color at a second angle of incident light or viewing.

In a further alternative embodiment, flake 80 can be formed without the absorber layer. In this embodiment, dielectric layer 84 is formed of contiguous high/low (H/L) dielectric optical coatings similar to the dielectric optical stacks described previously. Thus, dielectric layer 84 can have the coating structure $(HL)^n$, $(LH)^n$, $(LHL)^n$, $(HLH)^n$, or other similar configurations, where n=1-100 and the L and H layers are 1 QW at a design wavelength.

Various conventional coating processes can be utilized in forming the dielectric and absorber layers by encapsulation. For example, suitable methods for forming the dielectric layer include vacuum vapor deposition, sol-gel hydrolysis, CVD in a fluidized bed, downstream plasma onto vibrating trays filled with particles, and electrochemical deposition. Suitable methods for forming the absorber layers include vacuum vapor deposition, and sputtering onto a mechanically vibrating bed of particles, such as disclosed in U.S. Pat. No. 6,241,858 B1, which is incorporated by reference herein. Alternatively, the absorber coating may be deposited by decomposition through pyrolysis of metal-organo compounds or related CVD processes which may be carried out in a fluidized bed. If no further grinding is carried out, these methods result in an encapsulated magnetic core with dielectric and absorber layers therearound. Various combinations of the above coating processes may be utilized during manufacture of pigment flakes with multiple encapsulating coatings.

Various modifications and combinations of the foregoing embodiments are also considered within the scope of the invention. For example, additional dielectric, absorber, and/or other optical coatings can be formed around each of the above embodiments to yield further desired optical characteristics. Such additional coatings can provide further color effects to the pigments.

In addition, an optional transparent overlayer coating can be formed on the outer surface(s) of each of the foregoing pigment embodiments to improve durability. For example, FIG. 2 depicts in phantom a first transparent overlayer coating 52 over absorber layer 50, and a second transparent overlayer coating 54 over absorber layer 48. FIG. 4 depicts in phantom an optional transparent overlayer coating 90 surrounding absorber layer 86. The transparent overlayer coating can be composed of any suitable transparent material that imparts protection, such as the high index and low index dielectric materials discussed previously, as well as polymers such as acrylates and styrenes, glassy materials such as silicate and borosilicate glasses, or combinations thereof. The transparent overlayer coating can be formed to have a suitable physical thickness from about 5 nm to about 10 μm, and preferably from about 100 nm to about 1 μm.

Additional flake embodiments that can be modified to include the insulator layer between a magnetic layer and a reflector layer as described herein are disclosed in a copending patent application Ser. No. 09/844,261, filed on Apr. 27, 2001, and entitled "Multi-layered Magnetic Pigments and Foils", the disclosure of which is incorporated by reference herein.

The pigment flakes of the present invention can be interspersed within a pigment medium to produce a colorant composition that can be applied to a wide variety of objects or papers. The pigment flakes added to a medium produces a predetermined optical response through radiation incident on a surface of the solidified medium. Preferably, the pigment medium contains a resin or mixture of resins that can be dried or hardened by thermal processes such as thermal cross-linking, thermal setting, or thermal solvent evaporation, or by photochemical cross-linking.

Suitable pigment media include various polymeric compositions or organic binders such as alkyd resins, polyester resins, acrylic resins, polyurethane resins, vinyl resins, epoxies, styrenes, and the like. Examples of suitable resins include melamine, acrylates such as methyl methacrylate, ABS (acrylonitrile butadiene styrene) resins, ink and paint formulations based on alkyd resins, and various mixtures thereof. The pigment medium also preferably contains a solvent for the resin, such an organic solvent or water. The flakes combined with the pigment media produce a colorant composition that can be used directly as a paint, ink, or moldable plastic material. The colorant composition can also be utilized as an additive to conventional paint, ink, or plastic materials.

In addition, the flakes can be optionally blended with various additive materials such as conventional pigment flakes, particles, or dyes of different hues, chroma and brightness to achieve the color characteristics desired. For example, the flakes can be mixed with other conventional pigments, either of the interference type or noninterference type, to produce a range of other colors. This preblended composition can then be dispersed into a polymeric medium such as a paint, ink, plastic or other polymeric pigment vehicle for use in a conventional manner. Examples of suitable additive materials are disclosed in copending application Ser. No. 09/844,261 referenced previously.

The magnetic color shifting flakes of the present invention are particularly suited for use in applications where colorants of high chroma and durability are desired. By using the magnetic color shifting flakes in a colorant composition, high chroma durable paint or ink can be produced in which variable color effects are noticeable to the human eye. The color shifting flakes of the invention have a wide range of color shifting properties, including large shifts in chroma (degree of color purity) and also large shifts in hue (relative color) with a varying angle of view. Thus, an object colored with a paint containing the color shifting flakes of the invention will change color depending upon variations in the viewing angle or the angle of the object relative to the viewing eye.

The pigment flakes of the invention can be easily and economically utilized in paints and inks which can be applied to various objects or papers, such as motorized vehicles, currency and security documents, household appliances, architectural structures, flooring, fabrics, sporting goods, electronic packaging/housing, product packaging, etc. The color shifting flakes can also be utilized in forming colored plastic materials, coating compositions, extrusions, electrostatic coatings, glass, and ceramic materials.

Generally, the foils of the invention have a nonsymmetrical thin film coating structure, which can correspond to the layer structures on one side of an RMF in any of the above described embodiments related to thin film stack flakes. The foils can be laminated to various objects or can be formed on a carrier substrate. The foils of the invention can also be used in a hot stamping configuration where the thin film stack of the foil is removed from a release layer of a substrate by use of a heat activated adhesive and applied to a countersurface. The adhesive can be either coated on a surface of the foil opposite from the substrate, or can be applied in the form of a UV activated adhesive to the surface on which the foil will be affixed.

Figure 5:
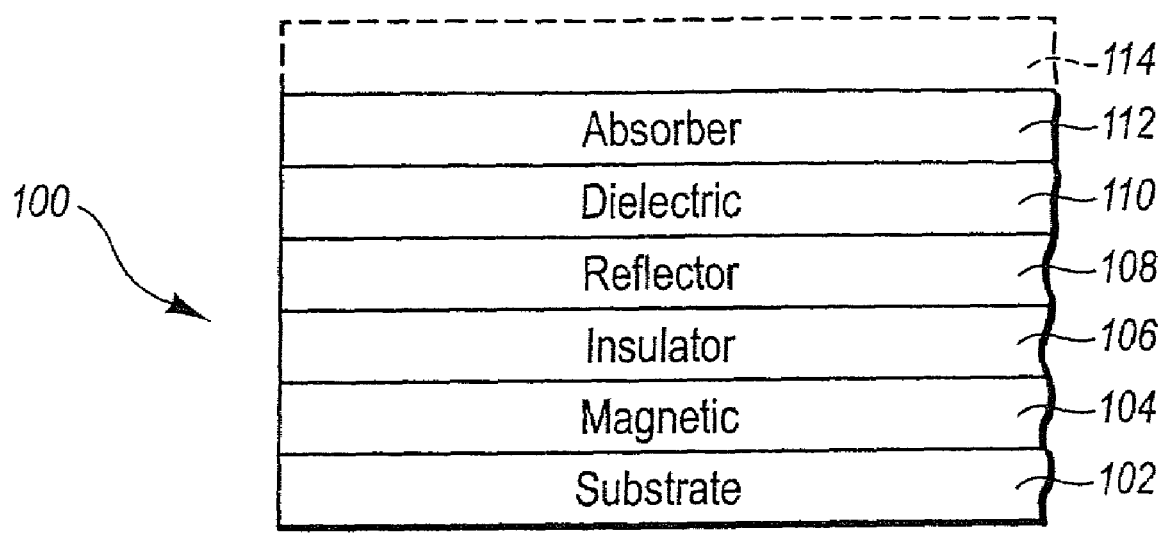
FIG. 5 is a schematic representation of the coating structure of a magnetic foil according to the invention.

FIG. 5 depicts a coating structure of a color shifting foil 100 formed on a substrate 102, which can be any suitable material such as a flexible PET web, carrier substrate, or other plastic material. The foil 100 includes a magnetic layer 104 over substrate 102, an insulator layer 106 over magnetic layer 104, a reflector layer 108 over insulator layer 106, a dielectric layer 110 over reflector layer 108, and an absorber layer 112 over dielectric layer 110. The magnetic, insulator, reflector, dielectric, and absorber layers can be composed of the same materials and can have the same thicknesses as described previously for the corresponding layers in flakes 20 and 40.

The foil 100 can be formed by a web coating process, with the various layers as described above sequentially deposited on a web by conventional deposition techniques to form a thin film foil structure. The foil 100 can be formed on a release layer of a web so that the foil can be subsequently removed and attached to a surface of an object. The foil 100 can also be formed on a carrier substrate, which can be a web without a release layer.

In addition, an optional transparent overlayer coating can be formed on the foils of the invention to improve durability. For example, FIG. 5 depicts in phantom a transparent overlayer coating 114 over absorber layer 112. The transparent overlayer coating 114 can be composed of any suitable transparent materials that impart protection, such as the materials discussed previously with respect to the transparent overlayer coatings of the pigment embodiments of the invention, and can have the same thickness ranges as such coatings.

Additional foil embodiments that can be modified to include the insulator layer between a magnetic layer and a reflector layer as described herein are disclosed in copending application Ser. No. 09/844,261 referenced previously. Other embodiments, such as various optical articles with paired optically variable structures, can utilize the magnetic pigment flakes and foils of the invention. Such optical articles are disclosed in application Ser. No. 09/844,261. Various uses for magnetic pigments and foils are also disclosed in application Ser. No. 09/844,261.

The following examples are given to illustrate the present invention, and are not intended to limit the scope of the invention.

EXAMPLE 1

Different samples of bright color shifting pigment flakes with the same thickness of $MgF_2$ and Cr, but with different thicknesses of an insulator layer, were fabricated by depositing thin film layers on a web. The thin film layers were stripped to produce flakes that were reduced in size to about 20 nm (average size of a single flake).

The first sample pigment flake had a conventional five-layer design of $Cr/MgF_2/Al/MgF_2/Cr$. The second sample pigment flake was magnetic and had a seven-layer design of $Cr/MgF_2/Al/Ni/Al/MgF_2/Cr$. The third sample pigment flake was magnetic and had a nine-layer coating design of $Cr/MgF_2/Al/MgF_2Ni/MgF_2/Al/MgF_2/Cr$. The $MgF_2$ insulator layers between the Al and Ni layers had a thickness of 16 nm. The fourth sample pigment flake had the same nine-layer coating design as the third sample, except that the $MgF_2$ insulator layers between the Al and Ni layers had a thickness of 23 nm. The fifth sample pigment flake had the same nine-layer coating design as the third sample, except that the $MgF_2$ insulator layers between the Al and Ni layers had a thickness of 25 nm. The sixth sample pigment flake was magnetic and had a nine-layer coating design of $Cr/MgF_2/Al/Al_2O_3/Ni/Al_2O_3/Al/MgF_2/Cr$. The $Al_2O_3$ insulator layers between the Al and Ni layers had a thickness of 20 nm.

EXAMPLE 2

A paint vehicle and ground pigments of the samples of Example 1 were mixed in the ratio of 9:1 to make paint samples. The paint samples were spread on polyester sheets with a blade. Dry 1"×3" pieces of painted polyester were immersed in a 2 wt-% water solution of NaOH for 10 minutes. The color of each sample was measured before and after the immersion test. The color difference ΔE was used for comparison of the tested samples. The color difference ΔE in the L*a*b* color space indicates the degree of color difference but not the direction and is defined by the equation:

$$\Delta E = [(\Delta L^*)^2 + (\Delta a^*)^2 + (\Delta b^*)^2]^{1/2}$$

where ΔL*, Δa*, Δb* are differences in L*, a*, and b* values, respectively. A larger ΔE indicates a large color difference caused by degradation of the thin film layers in the pigment flakes. In this example, the ΔE is the color change as a result of the exposure to NaOH. Table 1 lists the color difference of all the tested paint samples.

TABLE 1

| Sample | Pigment design | ΔE after NaOH |
|---|---|---|
| 1 | 5 layer stack with no dissimilar metals | 34.20 |
| 2 | 7 layer stack with no insulator layers | 54.77 |
| 3 | 9 layer stack with 16 nm thick insulator layers of $MgF_2$ | 59.93 |
| 4 | 9 layer stack with 23 nm thick insulator layers of $MgF_2$ | 39.32 |
| 5 | 9 layer stack with 25 nm thick insulator layers of $MgF_2$ | 31.34 |
| 6 | 9 layer stack with 20 nm thick insulator layers of $Al_2O_3$ | 34.00 |

As shown in Table 1, samples 2 and 3 had a much larger ΔE after NaOH immersion than samples 4-6 which had the thicker insulator layers. Samples 4-6 showed color differences that were comparable to sample 1 which had no dissimilar metals.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A color shifting interference structure, comprising:

a magnetic layer;

an insulator layer over the magnetic layer;

a reflector layer over the insulator layer;

a dielectric layer over the reflector layer; and an absorber layer over the dielectric layer; wherein the interference structure exhibits a discrete color shift such that the interference structure has a first color at a first angle of incident light or viewing and a second color different from the first color at a second angle of incident light or viewing, and the insulator layer has an effective thickness for substantially preventing corrosion of the interference structure.

2. The interference structure of claim 1, wherein the interference structure is a foil.

3. The interference structure of claim 2, further comprising a transparent overlayer coating over the absorber layer.

4. The interference structure of claim 2, further comprising a substrate carrier for supporting the foil.

5. The interference structure of claim 1, wherein the interference structure is an asymmetrical pigment flake.

* * * * *